United States Patent
Takeuchi et al.

(10) Patent No.: US 7,760,424 B2
(45) Date of Patent: Jul. 20, 2010

(54) INFRARED REFLECTING DEVICE

(75) Inventors: Hiromitsu Takeuchi, Aichi-ken (JP); Takeshi Miyazaki, Aichi-ken (JP); Hiroaki Ando, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 493 days.

(21) Appl. No.: 11/806,864

(22) Filed: Jun. 5, 2007

(65) Prior Publication Data

US 2007/0297046 A1    Dec. 27, 2007

(30) Foreign Application Priority Data

Jun. 22, 2006   (JP)   ............................. 2006-172302

(51) Int. Cl.
*F21V 9/04* (2006.01)

(52) U.S. Cl. ...................................... 359/359

(58) Field of Classification Search ............... None
See application file for complete search history.

(56) References Cited

U.S. PATENT DOCUMENTS 7,364,673 B2 *  4/2008  Arsenault et al. ........... 252/586

2007/0026210 A1   2/2007   Onishi et al.

FOREIGN PATENT DOCUMENTS

| JP | A-06-48776 | 2/1994 |
|---|---|---|
| JP | A-2004-27195 | 1/2004 |
| JP | A-2005-089244 | 4/2005 |
| JP | A-2005-89245 | 4/2005 |
| JP | A-2006-28202 | 2/2006 |

\* cited by examiner

*Primary Examiner*—Stephone B Allen
*Assistant Examiner*—Derek S Chapel
(74) *Attorney, Agent, or Firm*—Posz Law Group, PLC

(57) ABSTRACT

An infrared reflecting device includes a multi-layer infrared reflecting body composed of a plurality of superimposed infrared reflecting members, and temperature-sensitive members positioned surrounding the side faces of the multi-layer infrared reflecting body. The infrared reflecting member includes colloidal crystal particles arrayed at regular lattice spacing, and a filler interposed between the colloidal crystal particles. Depending on temperature, the temperature-sensitive members supply the filler with moisture, and the lattice spacing of the colloidal crystal particles changes due to swelling of the filler. Since lattice spacing changes the reflected wavelength from the ultraviolet region to the infrared region on the basis of Bragg's law and Snell's law, the amount of transmitted infrared radiation can be adjusted efficiently.

18 Claims, 5 Drawing Sheets

Fig.3

| | colloidal crystal particles | | | | | expanding/contracting filler | | | | infrared reflection characteristics | |
|---|---|---|---|---|---|---|---|---|---|---|---|
| | | | lattice spacing | | | | | refractive index | | | |
| | material | particle diameter (nm) | before swelling (nm) | after swelling (nm) | refractive index | material | water absorbency (%) | before swelling | after swelling | before swelling (nm) | after swelling (nm) |
| Reflective Material 1 | polystyrene | 118 | 96.3 | 289 | 1.59 | PVA gel | 200 | 1.5 | 1.38 | 302 | 862 |
| Reflective Material 2 | polystyrene | 118 | 96.3 | 771 | 1.59 | starch + PVA gel | 700 | 1.5 | 1.35 | 302 | 2189 |

Fig.5

| | colloidal crystal particles | | | | | expanding/contracting filler | | | | infrared reflection characteristics | |
|---|---|---|---|---|---|---|---|---|---|---|---|
| | material | particle diameter (nm) | lattice spacing | | refractive index | material | water absorbency (%) | refractive index | | before swelling (nm) | after swelling (nm) |
| | | | before swelling (nm) | after swelling (nm) | | | | before swelling | after swelling | | |
| Reflective Material 3 | TiO2/SiO2 complex | 220 | 180 | 539 | 1.5 | PVA gel | 200 | 1.5 | 1.44 | 539 | 1555 |
| Reflective Material 4 | TiO2/SiO2 complex | 300 | 245 | 735 | 1.5 | PVA gel | 200 | 1.5 | 1.44 | 735 | 2121 |
| Reflective Material 5 | TiO2/SiO2 complex | 400 | 327 | 980 | 1.5 | PVA gel | 200 | 1.5 | 1.44 | 980 | 2828 |

INFRARED REFLECTING DEVICE

This application claims the benefit of and priority from Japanese Application No. 2006-172302 filed Jun. 22, 2006, the content of which is incorporated herein by reference.

BACKGROUND OF THE INVENTION

1. Field of the Invention

The present invention relates to an infrared reflecting device that includes an infrared reflecting member able to change its reflectance of infrared radiation in response to an external stimulus such as temperature.

2. Description of the Related Art

Technologies proposed for reflecting infrared radiation contained in light from the sun include coating the surface of a glass panel with a pigment material that absorbs infrared radiation, or laminating an infrared reflecting film (JP-A-2005-089244 and JP-A-06-048776), used for reflecting infrared radiation during periods of high outside temperature to provide enhanced cooling action. However, these technologies also reflect infrared radiation when the outside temperature is low, and a resultant problem is that they cannot actively utilize the infrared radiation contained in sunlight.

An advantage of some aspects of the invention is provided with an infrared reflecting device for efficiently reflecting infrared radiation depending on an external stimulus.

SUMMARY

According to an aspect of the invention is provided with an infrared reflecting device including an infrared reflecting member for reflecting infrared radiation. The member comprises colloidal crystal particles arrayed at regular lattice spacing; and a filler interposed between the colloidal crystal particles, the filler changing the lattice spacing of the colloidal crystal particles by expanding and contracting in response to an external stimulus and, thereby shifting the reflected wavelength to the infrared region from a region of lower wavelength than infrared.

In the infrared reflecting member of the present invention, colloidal crystal particles are arrayed at regular lattice spacing with a filler interposed between them. When sunlight strikes the infrared reflecting member, according to Bragg's law and Snell's law, the reflected wavelength $\lambda$ peak, which is determined by the lattice spacing d of the (111) plane formed by the colloidal crystal particles, is represented by Equation (1).

$$\lambda\text{peak} = 2d(111)(n_{\text{eff}}^2 - \sin^2\theta)^{0.5} \quad (1)$$

$\lambda$ peak: reflected wavelength
$\theta$: incident angle
d(111): lattice spacing
neff: effective refractive index That is, wavelengths contained in incident sunlight can be reflected selectively through differences in lattice spacing. Here, the effective refractive index neff is determined by Equation (2), from the refractive index of the colloidal crystal particles, the refractive index of the filler, and the ratio of the two.

$$n_{\text{eff}} = (1-\phi)ns + \phi \cdot n\text{sphere} \quad (2)$$

nsphere: colloidal crystal particle refractive index
ns: filler refractive index
$\phi$: share of colloidal crystal particles per unit volume In response to an external stimulus the filler expands or contracts and changes the lattice spacing of the colloidal crystal particles, and the reflected wavelength $\lambda$ peak shifts to the infrared region from a region of lower wavelength than infrared. For this reason the amount of infrared radiation in sunlight transmitted or reflected by the infrared reflecting member can be adjusted effectively. Here, the region of lower wavelength than infrared excludes the X ray region and refers to the ultraviolet region or visible light region.

The invention in another embodiment is an infrared reflecting member for reflecting infrared radiation, wherein
the infrared reflecting member comprises colloidal crystal particles arrayed at regular lattice spacing; and a filler interposed between the colloidal crystal particles and capable of expanding or contracting in response to an external stimulus and changing the lattice spacing of the colloidal crystal particles; wherein the refractive index of the colloidal crystal particles and the refractive index of the filler prior to expansion are virtually identical; and when the filler has expanded, the refractive index of the filler changes and the reflected wavelength is set to the infrared region.

Equation (1) above is met in cases where the colloidal crystal particles and the filler differ in refractive index. In this other embodiment of the invention, since the refractive index of the filler prior to expansion is identical to the refractive index of the colloidal crystal particles, no reflected wavelength peak will appear in the visible light or infrared region. However, since the refractive index of the filler after expansion differs from the refractive index of the colloidal crystal particles, after the expanding/contracting material has expanded, the reflection parameters according to Bragg's law and Snell's law will be met and a reflected wavelength peak will appear in the infrared region, whereby infrared radiation can be efficiently reflected. Here, virtually identical values of refractive index of the filler prior to expansion and refractive index of the colloidal crystal particles refers to a range that is substantially adjustable by material change of the colloidal crystal particles and the filler and that does not appreciably reduce the transmitted amount of incident light.

In another preferred embodiment, the present invention may be constituted as a multilayer infrared reflecting body composed of multiple layers of infrared reflecting member, wherein the individual infrared reflecting members differ in particle diameter of the colloidal crystal particles, or differ in the expansion rate of the filler. By means of such a constitution, the reflected wavelength can vary in each individual layer of the infrared reflecting member, and the amount of transmitted infrared radiation can be controlled over a wide range.

Here, the colloidal crystal particles are not limited to any particular material provided that it is virtually spheroidal and can transmit Bragg reflected light; examples are polystyrene, $TiO_2$ and $SiO_2$, complexes of $TiO_2$ and $SiO_2$, and core/shell structures of $TiO_2$ and $SiO_2$, as well as silicon dioxide, borosilicate glass, calcium aluminate, lithium niobate, calcite, titanium oxide, strontium titanate, aluminum oxide, lithium fluoride, magnesium fluoride, yttrium oxide, calcium fluoride, barium fluoride, zinc selenide, thallium iodide, diamond and the like. Lead Zirconate Titanate (PZT), Lead Lanthanum Zirconate Titanate (PLZT) and other ferroelectrics, polyethylene, polyethylene terephthalic acid, vinyl chloride, acrylic, vinyl acetate, polystyrene, polypropylene, etc., or silicon or germanium can be used as well.

The regularity in arrangement of the colloidal crystal particles is not limited to any particular one, examples being face-centered cubic, body-centered cubic, simple cubic, or the like; and especially face-centered cubic structure, i.e. hexagonal closest-packed structure. The lattice spacing of the colloidal crystal particles will depend on the expansion rate of the filler, but must be such that in the expanded state, the Bragg reflected wavelength is within the infrared region.

In another preferred embodiment, the present invention can be constituted as an infrared reflecting device comprising infrared reflecting member, wherein the filler is a polymer that changes the lattice spacing of the colloidal crystal particles by absorbing/discharging a reversible movable material. Here, the reversible movable material refers to a solid, a liquid, a gas, or any mixture of these. Where the reversible movable material is a liquid, the polymer constituting the expanding/contracting material can be a water-absorbent polymer, it being possible to use a polyvinyl alcohol (PVA) gel or a mixture of a PVA gel, a starch, and an acrylic acid based water-absorbent polymer, with water absorbency set to the desired level by manipulating the proportions of these materials, the crosslinking density, the ion osmotic pressure, affinity with water, and so on.

Where a palladium hydrogen-occluding alloy is used as the filler, the material can expand and contract through absorption and discharge of hydrogen as the reversible movable material.

In yet another preferred embodiment, the present invention can have a constitution provided with a temperature-sensitive member composed of a temperature-sensitive polymer placed adjacent to the infrared reflecting member and capable of discharging or absorbing the reversible movable material from or into the water-absorbent polymer depending on temperature.

Where the reversible movable material is a liquid, the temperature-sensitive member can be composed of a temperature-sensitive polymer that releases liquid from or absorbs liquid into the water-absorbent polymer depending on temperature. Examples of such temperature-sensitive polymers are heat-responsive polymers composed of polyvinyl methyl ether, methyl cellulose, polyethylene oxide, polyvinyl oxazolidinone, a poly(N-alkyl acrylamide) such as poly(N-isopropyl acrylamide), or two or more types thereof; or heat-responsive polymers composed of poly(N-vinyl isobutylamide) or other poly(N-vinyl acid amides), and heat-responsive polymers which are copolymers of N-vinyl formamide or other N-vinyl alkyl amide with vinyl acetate or other hydrophobic monomer, such as those disclosed in JP-A 7-62038, JP-A 7-82320, JP-A 8-143631, JP-A 10-17622, and JP-A 10-310614.

Here, where the temperature-sensitive member is capable of retaining within the temperature-sensitive material an amount of liquid equal to or more than the amount of liquid needed to expand the water-absorbent polymer to the lattice spacing at which infrared radiation is reflected, the water-absorbent polymer can be efficiently supplied with and absorb the liquid.

In a preferred embodiment the filler can be a polymer that gives rise to mechanical change such as expansion and contraction in response to temperature; or one that changes the lattice spacing of the colloidal crystal particles due to an external stimulus such as electricity or light. For example, materials that expand or contract in response to external stimulus by electricity are liquid crystal elastomers composed of a nematic solvent and an organogel having mesogen side chains; electrically-conductive polymers (polypyrrole); ion-conductive polymers (Nafion); dielectric elastomers (acrylic, silicone, urethane); piezoelectric elastomers (polyvinylidene fluoride), or other polymers. Additionally, as long as the material expands or contracts due to an external stimulus, polymers that expand or contract due to pH, or photochromic materials that expand or contract depending on the wavelength of light (azobenzene and the like) can be used as well.

In yet another preferred embodiment, the infrared reflecting device may comprise a support that transmits visible light and infrared radiation, with the support holding the infrared reflecting member. The infrared reflecting device employing a support is not limited to any particular configuration provided that it can hold the infrared reflecting member; examples are a configuration involving lamination to a transparent substrate of glass or the like, or sandwiching between a plurality of glass panels, appropriate for use as architectural or automotive window glass. The infrared reflecting device may also employ an opaque or translucent support, appropriate for use in components that are touched with the hand, such as an automobile steering wheel or arm rest, a console box or console box lid, or door handles; or an architectural wall material.

These and other objects, features, aspects, and advantages of the present invention will become more apparent from the following detailed description of the preferred embodiments with the accompanying drawings.

BRIEF DESCRIPTION OF THE DRAWINGS

FIG. 3 shows the configuration and properties of the infrared reflecting members.

FIG. 5 shows the configuration and properties of the infrared reflecting members.

DESCRIPTION OF THE PREFERRED EMBODIMENTS

The best mode for carrying out the invention will be described below.

A. First Embodiment (1) General Configuration of Infrared Reflecting Device 10

Figure 1:
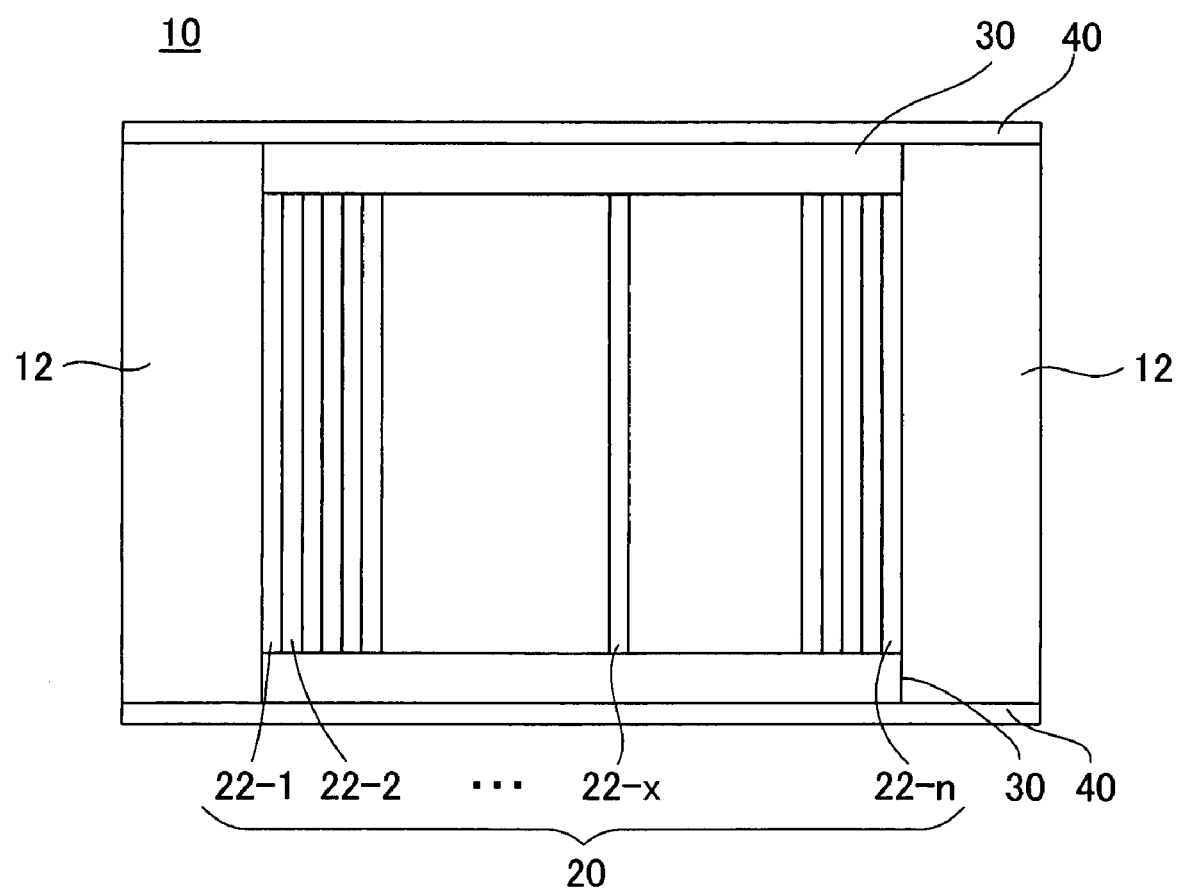
FIG. 1 shows an infrared reflecting device which employs infrared reflecting member in accordance with a first embodiment of the present invention.

FIG. 1 shows an infrared reflecting device which employs infrared reflecting member in accordance with the first embodiment of the present invention. In FIG. 1, The infrared reflecting device 10 is furnished with transparent substrates 12, 12 positioned parallel to one another and spaced apart by a prescribed gap; a multi-layer infrared reflecting body 20 positioned between the transparent substrates 12, 12; temperature-sensitive members 30, 30 positioned surrounding the side faces of the multi-layer infrared reflecting body 20; and sealing members 40 covering the outside of the temperature-sensitive members 30, 30.

(2) Configuration of Individual Parts of Infrared Reflecting Device 10

The transparent substrates 12, 12 are plates capable of transmitting the visible light and infrared radiation components of sunlight, and are made of glass plates, transparent resin, or the like. The multi-layer infrared reflecting body 20 is composed of a plurality of infrared reflecting members 22-1, 22-2 . . . 22-x . . . 22-n superimposed in n layers; for example, where the thickness of a single infrared reflecting member 22-x is 1.27 µm, a stack of 21 of these has thickness of 26.5 µm.

Figure 2A:
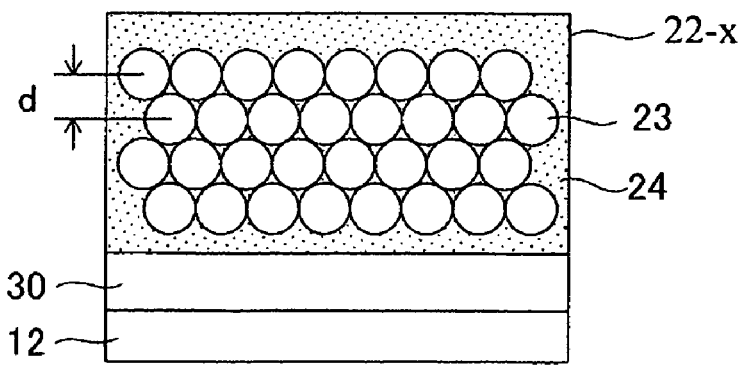
FIGS. 2A, 2B and 2C show the infrared reflecting device.
Figure 2B:
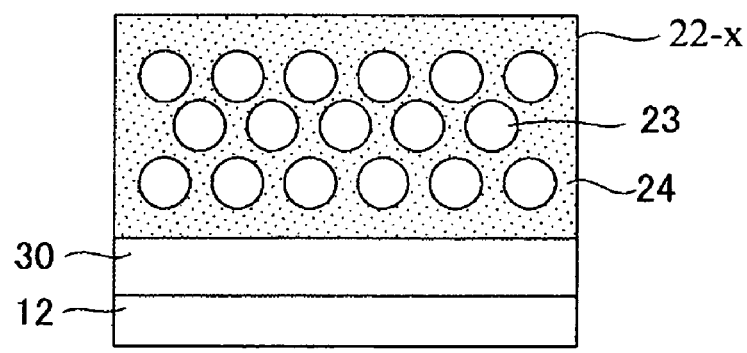
Figure 2C:
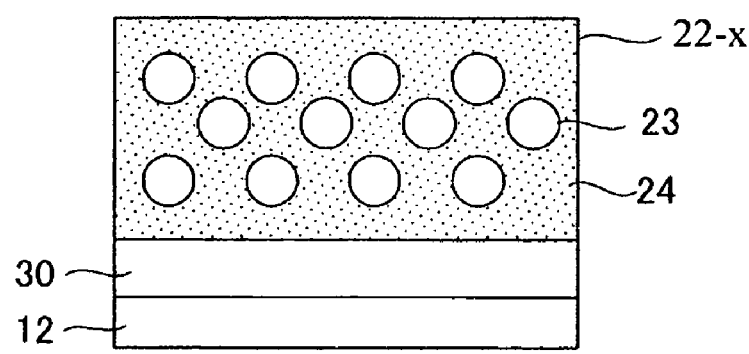

FIGS. 2A, 2B and 2C show the infrared reflecting device 10, and FIG. 3 shows the configuration and properties of infrared reflecting members. In FIG. 2A, the infrared reflecting member 22-x is composed of colloidal crystal particles 23 and a filler 24 filling the space between the colloidal crystal particles 23. The colloidal crystal particles 23 are arranged in closest-packed arrangement. FIG. 3 gives two examples of the infrared reflecting member 22 (Reflecting Materials 1 and 2) having filler 24 of different compositions. Where polystyrene is used as the colloidal crystal particles 23 for example, the lattice spacing d(111) in the crystal plane (111) of colloidal crystal particles 118 nm in particle diameter will be 96.3 nm.

The filler 24 is formed of PVA gel, or a mixture of starch and an acrylic acid based water-absorbent polymer, and has the property of swelling and contracting through absorption and discharge of water. The filler 24 fills the space between the colloidal crystal particles 23, and as shown in FIGS. 2B and 2C changes the lattice spacing of the colloidal crystal particles 23 through swelling and contraction. Reflecting Material 1 uses PVA gel having water absorbency of 200%, capable of increasing the lattice spacing from 96.3 nm to 289 nm through swelling; Reflecting Material 2 uses a mixture of starch and an acrylic acid based water-absorbent polymer having water absorbency of 700%, capable of increasing the lattice spacing from 96.3 nm to 771 nm through swelling. Besides the compositions of the fillers of Reflecting Materials 1 and 2, the proportions of the PVA gel and the mixture of starch and acrylic acid based water-absorbent polymer may be manipulated to vary the water absorbency between 200 and 700%, and by varying the water absorbency in this way to set the lattice spacing d(111) of the colloidal crystal particles to different values in individual layers so as to increase from 99.3 nm to between 289 nm and 771 nm.

Returning to FIG. 1, the temperature-sensitive members 30 are positioned surrounding the side faces of the multi-layer infrared reflecting body 20 and consist of material that releases or absorbs moisture depending on temperature, and that has higher water absorbency than the water-absorbent polymer of the filler 24. Where, for example, N-isopropyl acrylamide gel (NIPA gel) is used for the temperature-sensitive members 30, contained moisture will be discharged above a prescribed temperature, whereas below a prescribed temperature moisture will be absorbed. With NIPA gel, the prescribed temperature can be established appropriately between 20-60° C. depending on the composition; where the intended application is architectural window glass, considerations of indoor cooling action make a setting of between 25-30° C. preferable.

(3) Method for Making Multi-layer Infrared Reflecting Body

The infrared reflecting device 10 can be manufactured using methods known in the art (JP-A 2004-109178 and JP-A 2004-170447), and can be manufactured by a process such as the following, by way of example. A transparent substrate 12 is prepared, and a monodisperse colloidal solution is dripped onto the transparent substrate 12. The monodisperse colloidal solution is prepared by dispersing colloidal crystal particles in a solvent (such as water), followed by a demineralization process. Next, the solvent on the transparent substrate 12 is dried out and the colloidal crystal particles assume regular arrangement. At this time the colloidal crystal particles arrange autonomously and regularly. A filler (PVA gel) is then dripped over the regularly arranged colloidal crystal particles and dried, thereby forming a single infrared reflecting member 22-x. This process is then repeated in succession while varying the proportions of PVA gel and mixture of starch and acrylic acid based water-absorbent polymer forming the filler 24. By so doing there can be produced a multi-layer infrared reflecting body 20 composed of a plurality of superimposed infrared reflecting members 22-x.

(4) Operation of Infrared Reflecting Device 10

(4)-1 Basic Principle of Infrared Reflecting Member

The basic principle of reflecting infrared radiation using an infrared reflecting member will now be discussed. The reflected wavelength λ peak, which is determined by the lattice spacing d of the (111) plane formed by the colloidal crystal particles, is represented by Equation (1), according to Bragg's law and Snell's law representing the relationship between refractive index and reflection.

$$\lambda peak = 2d(111)(neff^2 - \sin^2\theta)^{0.5} \quad (1)$$

λ peak: reflected wavelength
θ: incident angle
d(111): lattice spacing
neff: effective refractive index That is, wavelengths contained in incident sunlight can be reflected selectively through differences in lattice spacing.

Here, the effective refractive index neff is determined by Equation (2), from the refractive index of the colloidal crystal particles, the refractive index of the filler, and the ratio of the two.

$$neff = (1-\phi)ns + \phi \cdot nsphere \quad (2)$$

nsphere: colloidal crystal particle refractive index
ns: filler refractive index
φ: share of colloidal crystal particles per unit volume Here, according to the laws mentioned above, in the event that the colloidal crystal particle refractive index nsphere and the filler refractive index ns are the same, incident light will be transmitted, whereas if they are different, specific wavelengths will be reflected. In the present embodiment, as shown in FIG. 3, they are different, i.e. the colloidal crystal particles of polystyrene have a refractive index of 1.59 while the filler has a refractive index of 1.5, and thus from Equations (1) and (2), the reflected wavelength λ peak shifts in association with the lattice spacing d of the colloidal crystal particles. Since the lattice spacing d of the colloidal crystal particles changes with the water absorbency of the water-absorbent polymer of the filler, by setting the reflected wavelength λ peak in the infrared region, infrared radiation of specific wavelengths can be selectively reflected.

(4)-2 Operation of Infrared Reflecting Device 10

Figure 4:
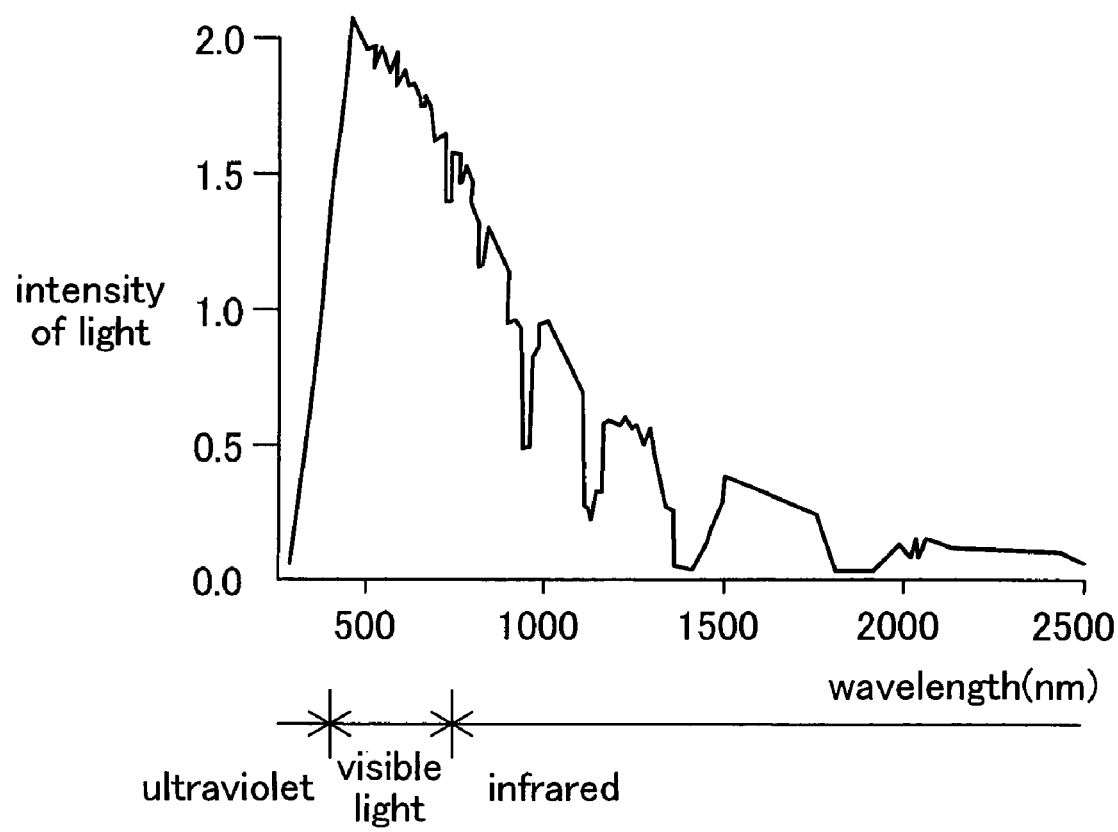
FIG. 4 shows the wavelength intensity distribution of the sunlight spectrum.

The operation of the infrared reflecting device 10 will now be described on the basis of Bragg's law mentioned above. Where the temperature-sensitive members 30, 30 are at or below prescribed temperature (25° C.) due to the influence of outside temperature, moisture is not released by the filler 24 of the infrared reflecting member 22-x and thus the lattice spacing of the colloidal crystal particles 23 remains at 96.3 nm. Accordingly, the reflected wavelength λ peak is 302 nm which lies in the ultraviolet region, so visible light and infrared radiation are transmitted. Thus, where this infrared reflecting device 10 is used in window glass, at low outside temperature visible light will pass through so that the room does not become dark, and the infrared radiation in sunlight will be transmitted so that warming action is not lost.

Where on the other hand the temperature-sensitive members 30, 30 exceed the prescribed temperature (25° C.) due to the influence of outside temperature, they release moisture. The moisture released by the temperature-sensitive members 30, 30 is supplied through capillary action to the water-absorbent polymer of the filler 24 of each infrared reflecting member 22-*x*. The water-absorbent polymer swells through absorption of moisture and increases the lattice spacing of the colloidal crystal particles 23. Specifically, in the case of Reflective Material 1 in FIG. 3, the lattice spacing of the colloidal crystal particles expands from 96.3 nm to 289 nm shifting the reflected wavelength λ peak from 302 nm to 862 nm; in the case of Reflective Material 2, the lattice spacing of the colloidal crystal particles expands from 96.3 nm to 771 nm shifting the reflected wavelength λ peak from 302 nm to 2189 nm. FIG. 4 is an illustration depicting the wavelength intensity distribution of the sunlight spectrum. In the sunlight spectrum, the ultraviolet region is <400 nm, the visible light region is 400-700 nm, and the infrared region is >700 nm. Consequently, Reflective Materials 1 and 2 shift their reflected wavelength λ peak from the ultraviolet region to the infrared region. The individual infrared reflecting members 22-*x* have differing water absorbency due to the composition of the expanding/contracting material 24, and with swelling of the material assume different lattice spacing of the colloidal crystal particles 23, so the reflected wavelengths λ peak do not overlap, but are distributed widely through the infrared region. Thus, a wide range of wavelengths of infrared radiation can be reflected. Consequently, where this infrared reflecting device 10 is used in window glass, at high outside temperature visible light will pass through so that the room does not become dark, while the infrared radiation in sunlight will be blocked so that cooling action is not lost.

If on the other hand the temperature of the temperature-sensitive members 30, 30 falls below the prescribed temperature (25° C.), since the temperature-sensitive members 30, 30 reversibly boost water absorbency, moisture will be absorbed from the water-absorbent polymer of the filler 24. Thus, the filler 24 of the infrared reflecting member 22-*x* will contract and reduce the lattice spacing of the colloidal crystal particles 23, restoring them to the initial state.

B. Second Embodiment

The present embodiment features a configuration in which the particle diameter of the colloidal crystal particles of the infrared reflecting member varies among the individual layers. Specifically, the relationship between colloidal crystal particle diameter and lattice spacing is represented by Equation (3).

$$D = (3/2)^{0.5} d(111) \quad (3)$$

D: particle diameter

From Equation (3), a change in particle diameter D will produce a change in lattice spacing d(111), thus shifting the reflected wavelength λ peak. Utilizing this basic principle, in the present embodiment, the colloidal crystal particle diameter is made to differ among individual layers, while making the expansion rate of the filler the same in each layer, whereby with the filler in the expanded state, the reflected wavelength λ peak is established in the infrared region. Working effects similar to those of the first embodiment are attained thereby.

C. Third Embodiment

The third embodiment features a configuration employing material in which the particle diameter of the colloidal crystal particles of the infrared reflecting member varies among the individual layers, and in which the colloidal crystal particle refractive index and the filler refractive index are the same prior to swelling. FIG. 5 shows the configuration and properties of infrared reflecting members, showing three examples of infrared reflecting member of differing composition (Reflecting Materials 4, 5, and 6). Specifically, a complex of $TiO_2$ and $SiO_2$ prepared to have refractive index of 1.5 is used for the colloidal crystal particles, and the colloidal crystal particle diameter varies between 220 nm, 300 nm, and 400 nm, with the lattice spacing at this time being 180 nm, 245 nm, and 327 nm. PVA gel with water absorbency of 200% is used as the filler. The refractive indexes of the colloidal crystal particles and the filler prior to swelling are identical values of 1.5.

Through swelling of the filler due to absorption of water, the lattice spacing changes to 539 nm, 735 nm, and 980 nm. While at this time the refractive index of the colloidal crystal particles is 1.5, the same as the refractive index prior to swelling, since the filler contains moisture, the refractive index is a smaller value of 1.44. Equation (1) described above is met in cases where the colloidal crystal particles and the filler have different refractive indices. However, since the refractive index prior to swelling of the filler in accordance with the present embodiment is the same as the refractive index of the colloidal crystal particles, infrared radiation will be transmitted even where the reflected wavelengths of Reflecting Materials 4, 5, and 6, are in the visible light region of 539 nm and the infrared region of 753 nm and 980 nm, according to values calculated by Equation (1) of Bragg's law. Consequently, even if outside temperature is low, visible light and infrared radiation in sunlight can be transmitted efficiently.

On the other hand, once the filler has swelled, the refractive index of the colloidal crystal particle remains unchanged at 1.5 while the refractive index of the filler declines to 1.44, so the condition for Bragg reflection is now met, and the reflected wavelengths of infrared radiation shift to 1555 nm, 2121 nm, and 2828 nm. Thus, infrared radiation in sunlight can be reflected efficiently.

The foregoing detailed description of the invention has been provided for the purpose of explaining the principles of the invention and its practical application, thereby enabling others skilled in the art to understand the invention for various embodiments and with various modifications as are suited to the particular use contemplated. The foregoing detailed description is not intended to be exhaustive or to limit the invention to the precise embodiments disclosed. Modifications and equivalents will be apparent to practitioners skilled in this art and are encompassed within the spirit and scope of the appended claims.

What is claimed is:

1. An infrared reflecting device including an infrared reflecting member for reflecting infrared radiation, the infrared reflecting member comprising:

colloidal crystal particles arrayed at regular lattice spacing; and a filler interposed between the colloidal crystal particles, the filler changing the lattice spacing of the colloidal crystal particles by expanding and contracting in response to an external stimulus and, thereby shifting reflected wavelength of the infrared reflecting member to the infrared region from a region of lower wavelength than infrared, and wherein the device includes multiple layers of the infrared reflecting member, each of the multiple layers of the infrared reflecting member including colloidal crystal particles having a particle diameter differing from a particle diameter of colloidal crystal particles of at least one other of the multiple layers of the infrared reflecting member.

2. The infrared reflecting device in accordance with claim 1, wherein the region of lower wavelength than infrared is ultraviolet region.

3. The infrared reflecting device in accordance with claim 1, wherein
the infrared reflecting member is configured such that a first refractive index of the colloidal crystal particles and a second refractive index of the expanding/contracting filler prior to expansion are virtually identical, and the reflected wavelength of the infrared reflecting member is shifted to the infrared region by changing the second refractive index when the filler expands.

4. The infrared reflecting device in accordance with claim 1, wherein
the filler is a polymer that changes the lattice spacing of the colloidal crystal particles by absorbing/discharging a reversible movable material.

5. The infrared reflecting device in accordance with claim 4, further comprising a temperature-sensitive member that is placed adjacent to the infrared reflecting member and composed of a temperature-sensitive polymer, the temperature-sensitive member being configured to discharge and absorb the reversible movable material from and into the polymer of the filler depending on temperature.

6. The infrared reflecting device in accordance with claim 1, wherein the external stimulus includes electricity or light.

7. The infrared reflecting device in accordance with claim 1, further comprising a support that transmits visible light and infrared radiation, and holds the infrared reflecting member.

8. The infrared reflecting device in accordance with claim 7, wherein
the support is a plurality of substrates that transmit visible light and infrared radiation, and
the infrared reflecting member is interposed between the substrates.

9. The infrared reflecting device in accordance with claim 7, wherein at least one of the substrates is a transparent material that transmits visible light.

10. An infrared reflecting device including an infrared reflecting member for reflecting infrared radiation, the infrared reflecting member comprising:
colloidal crystal particles arrayed at regular lattice spacing; and
a filler interposed between the colloidal crystal particles, the filler changing the lattice spacing of the colloidal crystal particles by expanding and contracting in response to an external stimulus and, thereby shifting reflected wavelength of the infrared reflecting member to the infrared region from a region of lower wavelength than infrared, and wherein
the device includes multiple layers of the infrared reflecting member, each of the multiple layers of the infrared reflecting member including a filler having an expansion rate differing from an expansion rate of a filler of at least one other of the multiple layers of the infrared reflecting member.

11. The infrared reflecting device in accordance with claim 10, wherein the
region of lower wavelength than infrared is ultraviolet region.

12. The infrared reflecting device in accordance with claim 10, wherein
the infrared reflecting member is configured such that a first refractive index of the colloidal crystal particles and a second refractive index of the expanding/contracting filler prior to expansion are virtually identical, and the reflected wavelength of the infrared reflecting member is shifted to the infrared region by changing the second refractive index when the filler expands.

13. The infrared reflecting device in accordance with claim 10, wherein
the filler is a polymer that changes the lattice spacing of the colloidal crystal particles by absorbing/discharging a reversible movable material.

14. The infrared reflecting device in accordance with claim 13, further comprising a temperature-sensitive member that is placed adjacent to the infrared reflecting member and composed of a temperature-sensitive polymer, the temperature-sensitive member being configured to discharge and absorb the reversible movable material from and into the polymer of the filler depending on temperature.

15. The infrared reflecting device in accordance with claim 10, wherein the
external stimulus includes electricity or light.

16. The infrared reflecting device in accordance with claim 10, further comprising a support that transmits visible light and infrared radiation, and holds the infrared reflecting member.

17. The infrared reflecting device in accordance with claim 16, wherein
the support is a plurality of substrates that transmit visible light and infrared radiation, and
the infrared reflecting member is interposed between the substrates.

18. The infrared reflecting device in accordance with claim 16, wherein at least one of the substrates is a transparent material that transmits visible light.

* * * * *